Aug. 7, 1945. C. B. FRANZ 2,381,044
POULTRY HANDLING METHOD
Filed May 11, 1943
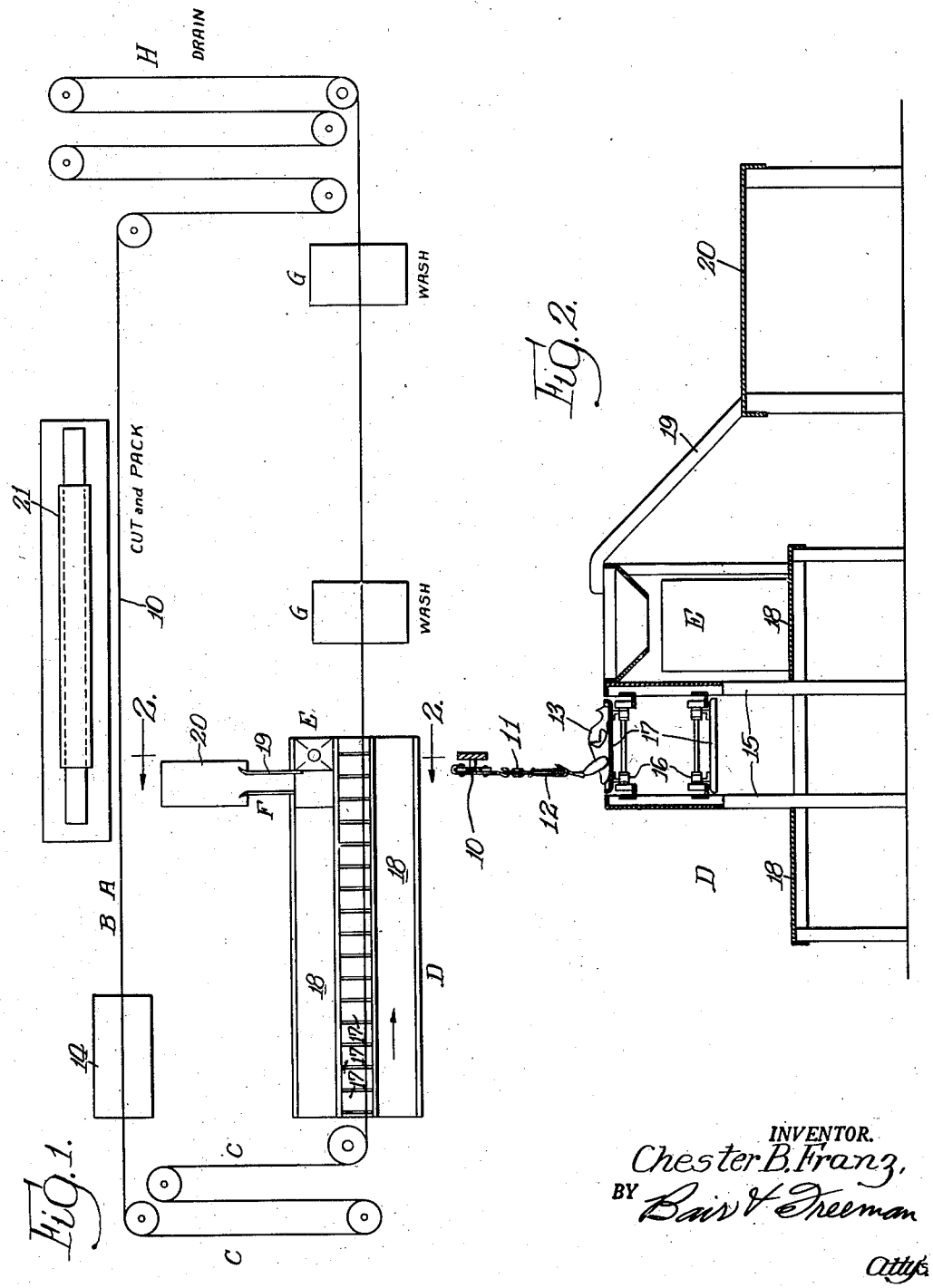
INVENTOR.
Chester B. Franz,
BY Bair & Freeman
Attys.

Patented Aug. 7, 1945

2,381,044

UNITED STATES PATENT OFFICE 2,381,044

POULTRY HANDLING METHOD

Chester B. Franz, Brentwood, Mo., assignor of one-half to Barker Poultry Equipment Company, a corporation of Iowa Application May 11, 1943, Serial No. 486,514

1 Claim. (Cl. 17—45)

My invention relates to a poultry handling method.

One object of my invention is to provide a poultry handling method whereby the poultry, in a poultry dressing establishment, may be hung on shackles on an endless conveyor and subjected to the various necessary operations, including, if desired, killing, slack scalding, examination and evisceration, without the removal of the birds from the shackles on the conveyor.

More particularly it is my object to arrange a second conveyor of the type having pans so that a stretch of that conveyor will be so located that birds supported on shackles from a main conveyor may rest on pans without removal from the shackles, in convenient position for examination and evisceration.

A detail of my operation involves an arrangement of the parts so that when the birds are in the pans, the shackles will be so spaced from the pans that the legs of the birds are held conveniently raised.

Another detail lies in the synchronization of the pans and shackles so that they travel together for the operations on the pans.

It is my purpose to provide a method whereby the birds are hung on shackles on a conveyor and the desired operations are performed without removal of the carcasses from the conveyor.

With these and other objects in view, my invention consists in the performance of my improved method, whereby the objects contemplated are attained, as hereinafter more fully set forth, pointed out in my claim and illustrated in the accompanying drawing, wherein:

Figure 1 is a plan view showing in diagrammatical fashion, the arrangement of the apparatus with which my method may be practiced.

Figure 2 is a detail sectional view taken on the line 2—2 of Figure 1.

It has been the practice heretofore in poultry houses, which dress large numbers of birds, to kill and pick the birds and then remove them from the conveyor on which they have been carried to work tables. In some cases they are removed from a main conveyor to a pan conveyor and from the pan conveyor to work tables.

The method heretofore followed has always involved the use of the necessary labor to carry out the work in the manner above described. My improved apparatus and method will involve a substantial saving in labor and reduction in the number of handlings to which each bird is subjected.

In the accompanying drawing I have used the reference numeral 10 to indicate generally an endless conveyor of the overhead type. Supported on this conveyor by chains 11 are shackles 12, each of which is adapted to support a bird 13 by the legs. This is a standard structure of the kind illustrated in Onorato and Weinaug Patent No. 2,210,377 and need not be further described in detail.

In an installation illustrative of my invention, the birds may be hung on the conveyor at station A and killed at station B. They may then pass to a slack scalder 14 and may be subjected to the picking and pinning operations at C—C. At D I have shown a pan conveyor. This may broadly consist of a main frame 15, as shown in Figure 2, having supported thereon the endless conveyor 16 which has the successive pans 17. A strip of the conveyor D is arranged adjacent a strip of the conveyor 10 in such relative fashion that the pans travel along where the birds may be conveniently supported on them, as shown in Figure 2.

At present the birds are lifted manually and placed on the pans. I contemplate however providing means whereby the birds will be automatically placed on the pans as the conveyors travel. The upper stretch of pans is so located with relation to the shackles 12 that the shackles function to hold the legs of the bird raised for facilitating examination and evisceration. Platforms 18 are arranged alongside the conveyor D for convenience in examining and eviscerating the birds.

On the conveyor D the birds are examined by the inspectors and those which are condemned may be removed from the shackles and conveyor. The operators, usually women, can carry on that part of the evisceration which involves the opening of the bird, the removal of the entrails and giblets. At station E the entrails are thrown down into a waste receiver, and at station F the giblets are slid down a chute 19 on to a receiving table 20, where they may be sorted and cleaned. All this work on the pans is done without removing the birds from the shackles or the main conveyor. It may be mentioned that the pan conveyor D has means for washing and cleaning the conveyor as the under-stretch of it is returned.

At stations G I provide washing means and any desired operation on the birds can be performed as they travel along on the conveyor 10 between the washing stations. At H the birds are drained. Alongside the conveyor 10 I provide the cutting and packing table 21.

It will be seen that by means of the apparatus hereinbefore described, the various objects hereinbefore mentioned can be conveniently accomplished and my improved method can be practiced. Particularly the birds may be opened and the entrails and giblets removed while the birds are resting on pans which are convenient for such operations, and for receiving blood and waste, and all this can be done without removal of the birds from the endless conveyor 10, and thereby I accomplish that saving in labor to which I have heretofore referred.

It will of course be understood that the showing of apparatus herein is illustrative only and that changes may be made in the structure and in the arrangement of parts without departing from the essential features of my invention, and I intend to cover by my claim any modifications which may be reasonably included within its scope without sacrificing any of the advantages thereof.

I claim as my invention:

A method of handling poultry which consists in hanging the birds at spaced intervals, advancing the birds and eviscerating each bird while additionally separately supported for advancement at the same speed for a stretch of travel for convenient evisceration.

CHESTER B. FRANZ.